Nov. 1, 1966    SYUKURO YANO ETAL    3,283,183
MAGNETOHYDRODYNAMIC GENERATING SYSTEM
Filed Oct. 22, 1962

INVENTOR.
SYUKURO YANO
TATSUMI HIRAMOTO
BY
Otto John Munz
Attorney

United States Patent Office 3,283,183
Patented Nov. 1, 1966

3,283,183
MAGNETOHYDRODYNAMIC GENERATING
SYSTEM
Syukuro Yano and Tatsumi Hiramoto, Tokai-mura, Naka-gun, Ibaraki-ken, Japan, assignors to Nihon Genshir-yoku Kenkyu Sho
Filed Oct. 22, 1962, Ser. No. 232,042
Claims priority, application Japan, Oct. 30, 1961, 36/39,129
11 Claims. (Cl. 310—11)

The present invention is directed to a magnetohydrodynamic generating system (hereinafter referred to as MHD generating system). In an MHD generating system, gas is, in general, heated by a suitable heat source to reach thermal equilibrium and a thermally ionized state. The ionized gas is introduced into a magnetic field under high velocity and thereafter the electromotive force generated by the mutual interaction between the magnetic field and the ionized and conductive gas is utilized.

Generally, if the conductivity of the gas used in an MHD generator is low, the output power density of the generator decreases, and, as the size of the generator becomes rapidly larger, the heat loss of the generator increases remarkably and therefore the efficiency of the generator decreases. Therefore, in order to generate electrical power economically, the conductivity of a gas must, in general, be in excess of 10 mhos/meter. For the purpose of raising the output power density in a generator through increasing conductivity of a gas by means of thermal ionization, the temperature of the gas should be set at 2000° K.–3000° K. However, raising the temperature of the gas 2000° K.–3000° K. increases the difficulty in guaranteeing the durability of the thermal resistive material and the technique in general to make the temperature high gets involved.

It is an object of the invention to provide a system in which an electrical field is used under a specified condition in an MHD generator and the conductivity of a gas generated by thermal ionization is increased remarkably by means of the electrical field and, therefore also the efficiency of the generator is increased over that of the present turbo-generator.

Another object of the invention is to apply an MHD generating system to the system of the present invention preferably at a temperature of the gas at about 1620° K.

It is another object of the invention to provide an MHD generating system in which the output power density of the generator is increased further by utilizing the electric field referred to above.

The foregoing and other objects, advantages and novel features of this invention, as well as the invention itself both as to its organization and to its mode of operation, may be best understood from the following description, when read in connection with the accompanying drawings in which.

Figure 1:
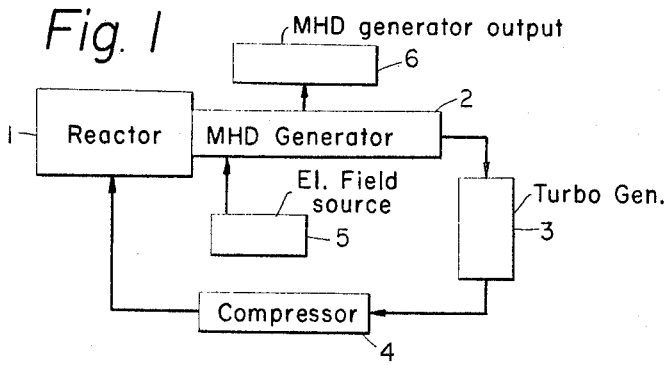
FIG. 1 is a schematic block diagram showing the MHD generating system provided in accordance with subject invention.

In the MHD generating system of the subject application shown in FIG. 1, electric fields are applied in the upstream or in the stream of the gas used in the MHD generator. The conductivity of the gas is obtained under a non-thermal equilibrium state, reference being made to the electric source for applying the electric field shown in FIG. 1. Therefore, the gas passing through the MHD generator can obtain sufficient conductivity to effect MHD generation even between 1000° K.–2000° K. and permit a reactor having a gas temperature of less than 2000° K. to operate sufficiently as a heat source shown in FIG. 1. The high temperature technique in a heat source such as a reactor can be attained remarkably easily when compared with the system shown in FIG. 3.

Figure 3:
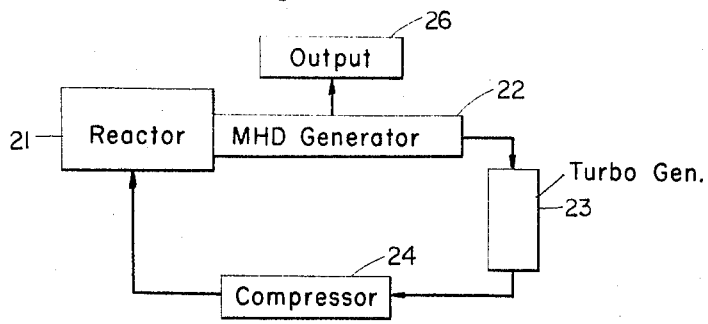
FIG. 3 is a schematic block diagram showing the MHD generating system in accordance with the prior art.

Further, since the temperature of the gas in the MHD generator shown in FIG. 1 is considerably less than the temperature of the gas in that shown in FIG. 3, the technique concerning the materials to be used in the MHD generator shown in FIG. 1 is less difficult than that in FIG. 3.

An MHD generating system of the prior art is shown in FIG. 3, in which reactor 21 using high temperature gas is connected to MHD generator 22. The electrical power from MHD generator 22 is supplied to MHD generator output 26 and the exhaust gas from MHD generator 22 is supplied to turbo-generator 23. The exhaust gas from turbo-generator 23 is fed back to reactor 21 through compressor 24. It is assumed that in the system, the gas heated up to 2000° K.–3000° K. in a high temperature reactor is ionized under a condition in thermal equilibrium so as to obtain a conductivity which causes MHD effective generation. Therefore, a reactor which can generate a gas having a temperature in excess of 2000° K. is required and a high class of high temperature technique is also required which results in technical difficulty.

An example of a plant embodying the MHD generating system of subject application is shown in FIG. 1, in which reactor 1 using high temperature gas is connected to MHD generator 2. A source 5 for an electric field is also connected to MHD generator 2. The electric power from the MHD generator 2 is supplied to the MHD generator output 6 and the exhaust gas from MHD generator 2 is supplied to turbo-generator 3. The exhaust gas from turbo-generator 3 is fed back to reactor 1 through compressor 4. The advantageous differences of the present system shown in FIG. 1 over that shown previously are as follows:

(1) A reactor of high temperature gas is used as a heat source and the gas temperature of the reactor is sufficiently higher than the highest temperature of the gas used in a generator for a gas turbine.

(2) The gas used is a rare gas or rare gases seeded with a proper quantity of alkali atoms.

Figure 2:
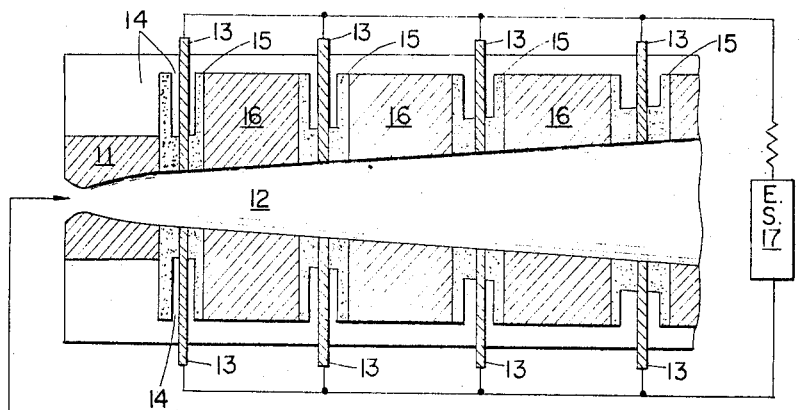
FIG. 2 is a view of the apparatus of the present invention partly in cross-section showing an embodiment of the path for generating electricity in which the electric field according to subject invention is applied.

(3) The generator is provided with a particular path for generating electricity (such as shown in FIG. 2) and with an electrical source for increasing electrical conductivity of the gas.

When the temperature of the gas spouting out of a reactor is between 1000° K.–2000° K., the generator employing the thermal ionization system of the prior art should have a length generally above 100 meters and the MHD generation is not practical.

In accordance with the present invention an electrical process is provided in which an electric field is applied to the gas having a temperature between 1000°–2000° K. and the temperature of the electron only is raised without raising the temperature of the gas so as to give to the gas a conductivity corresponding to a thermal ionization of the order in excess of 2500° K.

It is well known that the electrical conductivity of a gas is increased by electrical discharge, but how long and by what way the electric field may be applied to the gas which is a rare gas or rare gases seeded with a small quantity of the atom having a low ionization potential have not been clarified. The inventors theoretically studied the process in which energy of the electrons is neutralized into a neutral atom when the energy is supplied to the electrons from an external electric field, and they discovered a relationship of the time variation between the atom temperature and the electron temperature under a non-equilibrium process. On the basis of this relationship, the inventors studied the condition under which the electron temperature becomes maximum as the atom temperature rises, and found that the use of a discharge of high frequency which continues for a short interval, such as the relaxation time of the energy from an electron to an atom, is most efficient. For example, an electric field having about 10 kilo-volt and a pulse width of the order of 0.5 micro-second for 1 atmospheric pressure or 5 micro-seconds for 0.1 atmospheric pressure may be applied to a gas of a temperature of 1800° K. which contains argon gas seeded with a small amount of potassium atom or cesium atom. The effectiveness of applying a little longer pulses is not recognized, however applying pulses having a duration in excess of 50–70 micro-seconds decreases the effectiveness because the rate at which the energy is used for heating the atom increases.

An example of a path for generating electricity provided with the electrodes for applying electric field is shown in FIG. 2. The gas heated in a reactor passes through nozzle 11 and path 12 used for generating electricity at a high velocity such as in an order of 1000 meters/sec. The higher the velocity the better is the generation of electricity. A magnetic field is applied perpendicularly to the path 12. The electric field is applied by and between a pair of electrodes 13 spaced oppositely to each other and power take-off electrodes 16 from which the output power of the MHD generator is taken out are located between electrodes 13. Numeral 14 designates a conduit for a cooling agent to cool electrodes 13. An organic coolant is suitable for use as the cooling agent. Numeral 15 designates insulating material. Numeral 17 designates an electrical source for applying an electric field in the example shown in FIG. 2, connected to plural pairs of electrodes to apply an electric field in parallel and simultaneously along the path of the gas. The gap in the pairs of electrodes provided along the path are determined in accordance with the gas velocity and the degree of recombination of the electrons with the ions, with relation to the repeating periods of the electric pulse. The repetition period may be set at about 500 micro-seconds. It is presumed that the decrement of the electrical conductivity due to the recombination rate of the electrons with the ions when the gas passes through the gap between the electrodes is 10% or thereabout.

The characteristic features of the MHD generating system provided in accordance with the present invention as shown in FIG. 1 are compared with those of the prior MHD generating system as shown in FIG. 3 as follows:

(A) The operating temperature of the system shown in FIG. 1 is 1000° K.–2000° K., of the system shown in FIG. 3 is 2000° K.–3000° K.; therefore, technically it is easier to provide the system shown in FIG. 1 than the system shown in FIG. 3. In the system shown in FIG. 1, many kinds of materials can be utilized and the duration of continuation of the operation of the generator can be extended easily.

(B) The influence upon the performance of the high temperature reactor: In the system shown in FIG. 1 the reactor is sufficient to generate a gas having a temperature of 1000° K.–2000° K. and the system can be used in the high temperature gas cooled reactors the development of which is presently being researched throughout the world. In the system shown in FIG. 3 the reactor generating a high temperature gas having a temperature of 2000° K.–3000° K. causes an extremely great number of technical problems and the resolving of which will require many years of work.

(C) The output power density of the generators of both apparatus, as shown in FIG. 1 and FIG. 3, can result in plants with large power outputs (500 mw.–2000 mw.). In the apparatus shown in FIG. 1 the output power density of the generator can be raised by means of the pulsed electric field, and the other improvements described above. The reason is as follows: The output power density W of a generator is expressed in the following formula:

$$W \cong \tfrac{1}{2}\sigma U^2 B^2$$

where:

$\sigma$ is the conductivity of a gas in mhos/m.,
$U$ is the velocity of a gas in m./sec., and
$B$ is the magnetic induction in Wb./m.$^2$.

In this case, the electric field is applied to the generation of electricity in the apparatus shown in FIG. 1 and the temperature of the gas can be made high as compared with the ionization degree due to the thermal equilibrium. As an example of the thermal equilibrium, the data concerning a gas containing helium seeded with cesium are given below, helium being used in both the system shown in FIGS. 1 and 3 for the purposes of comparison.

| Temperature T (° K.) | 1,500 | 2,000 | 2,500 |
|---|---|---|---|
| Conductivity $\sigma$ (mhos/m.) | 0.3 | 12 | 120 |

It is to be understood from the data above that when the temperature T is 2250° K., conductivity $\sigma$ is 60 mhos/m. Therefore if it is assumed that $U=10^3$ m./sec. and $B=1.4$ Wb./m.$^2$ the output power density W becomes 60 mw./m.$^3$. This means that the length of the generator is about 20 m. in a plant whose capacity is 1200 mw.

In the system shown in FIG. 1, as a non-thermal ionization is effected against a gas whose temperature is 1000° K.–2000° K. even when the temperature of the gas is 1000° K.–2000° K. conductivity $\sigma$ becomes 100–500 mhos/m. easily. Under the same flow velocity of the gas and the same magnetic field as those of the system shown in FIG. 3 the output power density W becomes 100 mw./m.$^3$–500 mw./m.$^3$ which is 2 to 8 times greater than that obtained in the system shown in FIG. 3.

The energy of the electrical input for increasing the electric conductivity is only 1%–2% of the total output of the MHD generator. Under these conditions the increment of the electric conductivity corresponds to the thermal ionization at a temperature more than 2500° K., therefore the output power density of the generator becomes $10^3$–$10^4$ times that of the generator having no application of the electric field. It follows that the length of the generator is reduced to less than 10 m. This is considered to be a practical size, the heat loss is complemented sufficiently and the efficiency is also increased. Thus it will be understood that the selection of the applied electric voltage is also an important problem.

In the generating systems shown in FIGS. 1 and 3, the voltage and the current of the output power of the generator are determined in accordance with the design of the generator. For example, output current J and output voltage V are expressed roughly by the following formula:

$$V = UB$$

$$J = \tfrac{1}{2}\sigma UB$$

Therefore, under the condition in which flow velocity U and magnetic induction B are the same in the two generators shown in FIGS. 1 and 3, output voltages V of each of the two generators are equal.

As output current J is proportional to the conductivity $\sigma$ of the gas, the output current of the apparatus shown in FIG. 1 is 2–8 times the output current of the system shown in FIG. 3. Therefore this causes the output power density of the system shown in FIG. 1 to be high.

If it is assumed that $U=10^3$ m./sec. and $B=1.4$ wb./m.$^2$, then it results as follows:

| | $\sigma$ | $V_{volt}$ | $J_{amp}$ |
|---|---|---|---|
| In Fig. 1 | 100–500 | 1,400 | $7 \times 10^4$–$3.5 \times 10^5$ |
| In Fig. 3 | 60 | 1,400 | $4.2 \times 10^4$ |

The effect of the present invention is recognized when the system of the present invention is used together with the MHD generator of prior arts and the effect is raised even at a low temperature at which the system of the MHD generator of the prior arts cannot be utilized. In particular, in a system in which a rare gas is used, such as in the reactor heating, the present invention is used efficiently. When the pressure of the gas used in the system is reduced to an extent less than 0.1 atmospheric pressure, the efficiency of the present invention is further increased.

What is claimed is:

1. A magnetohydrodynamic generating system comprising a reactor, means to provide an operating gas in said reactor of a temperature between 1000° to 2000° K., and MHD generator connected to the output of said reactor, a turbo generator and a compressor with backfeed conduits of the MHD generator exhaust gases in sequence to said turbo generator, to said compressor and back to said reactor, MHD generator electric output means and means to excite the electrons only of said gas in said generator non-thermally to raise the effective temperature of the electrons and increase the conductivity of the gas without raising the temperature of the gas, said means to excite the electrons comprising means to apply an electric field to the path of the operating gas within said generator said means to apply an electric field to the path of the operating gas within said MHD generator comprising a first set of spaced pairs of electrodes symmetrically spaced outside of said path and an electric source connected to said electrodes and said MHD generator comprising a second set of pairs of output electrodes symmetrically spaced outside of said path within the space between the spaced pairs of electrodes formed by said first set of electrodes.

2. An MHD generating system as claimed in claim 1 and means to conduct the operating gas from said reactor through the MHD generator at a velocity of about 1000 meters per second.

3. A MHD generating system as claimed in claim 1, said means to apply an electric field to the path of the operating gas within said MHD generator further comprising means for cooling said first set of electrodes.

4. A MHD generating system as claimed in claim 1, said means to apply an electric field to the path of the operating gas within said MHD generator further comprising means for cooling said first set of electrodes and means isolating the two sets from each other.

5. An MHD generating system as claimed in claim 1, said means to apply said electric field providing an electric field of about 10 kilo-volts and a pulse width of a maximum of about 0.5 micro-second for 1 atmospheric pressure at gas temperature of about 1,800° K., said operating gas being argon seeded with a small quantity of potassium atom.

6. An MHD generating system as claimed in claim 1, said means to apply said electric field providing an electric field of about 10 kilo-volts and a pulse width of a maximum of about 0.5 micro-second for 1 atmospheric pressure at gas temperature of about 1,800° K., said operating gas being argon seeded with a small quantity of cesium atom.

7. An MHD generating system as claimed in claim 1, said means to apply an electric field to the path of the operating gas within said MHD generator further comprising means connecting said electric source to said first set of pairs of electrodes in parallel to apply an electric field simultaneously along the path of said gas.

8. An MHD generating system as claimed in claim 1, said means to apply an electric field being in advance of the gas while having a low degree of ionization due to thermal collisions.

9. An MHD generating system as claimed in claim 1, said operating gas being a rare gas seeded with alkali atoms.

10. An MHD generating system as claimed in claim 1, said means to apply an electric field including means to apply at least one high frequency electric field repeatedly and supplementary in a short period of time.

11. An MHD generating system as claimed in claim 1, said means to apply an electric field being means to apply at least one direct current field repeatedly and supplementary within a short period of time.

References Cited by the Examiner

UNITED STATES PATENTS

| | | | |
|---|---|---|---|
| 3,140,411 | 7/1964 | Oickle | 310—11 |
| 3,155,850 | 11/1964 | Meyer | 310—11 |

FOREIGN PATENTS

| | | |
|---|---|---|
| 1,274,003 | 9/1961 | France. |
| 738,511 | 10/1955 | Great Britain. |

OTHER REFERENCES

Discovery; The Magazine of Scientific Progress, August 1961, pp. 326 to 331.

Engineering Aspects of Magnetohydrodynamics, papers delivered on this subject at symposium in March 1961, edited by Mannal and Mather, pp. 123 to 126.

MILTON O. HIRSHFIELD, *Primary Examiner.*

DAVID X. SLINEY, ORIS L. RADER, *Examiners.*